US008474246B2

(12) United States Patent
Boegner et al.

(10) Patent No.: US 8,474,246 B2
(45) Date of Patent: Jul. 2, 2013

(54) METHOD OF OPERATING A PARTICLE FILTER IN THE EXHAUST SYSTEM OF A MOTOR VEHICLE'S INTERNAL COMBUSTION ENGINE

(75) Inventors: Walter Boegner, Remseck (DE); Andreas Hertzberg, Markgröningen (DE)

(73) Assignee: Daimler AG, Stuttgart (DE)

( * ) Notice: Subject to any disclaimer, the term of this patent is extended or adjusted under 35 U.S.C. 154(b) by 1633 days.

(21) Appl. No.: 11/455,220

(22) Filed: Jun. 16, 2006

(65) Prior Publication Data
US 2006/0266023 A1 Nov. 30, 2006

Related U.S. Application Data

(63) Continuation-in-part of application No. PCT/EP2004/013265, filed on Nov. 23, 2004.

(30) Foreign Application Priority Data

Dec. 18, 2003 (DE) .................................. 103 59 395

(51) Int. Cl.
 *F01N 3/00* (2006.01)
(52) U.S. Cl.
 USPC .................... 60/295; 60/274; 60/286; 60/311
(58) Field of Classification Search
 USPC ............................. 60/274, 286, 295, 297, 311
 See application file for complete search history.

(56) References Cited

U.S. PATENT DOCUMENTS

| 6,755,016 B2 * | 6/2004 | Dittler et al. | 60/297 |
| 6,829,890 B2 * | 12/2004 | Gui et al. | 60/295 |
| 6,928,809 B2 * | 8/2005 | Inoue et al. | 60/297 |
| 6,989,045 B2 * | 1/2006 | Bailey et al. | 95/129 |
| 7,069,721 B2 * | 7/2006 | Gotou | 60/297 |
| 7,197,868 B2 * | 4/2007 | Yahata et al. | 60/297 |
| 2002/0112472 A1 | 8/2002 | Tashiro | |
| 2003/0167756 A1 | 9/2003 | Symkowicz | |

FOREIGN PATENT DOCUMENTS

| DE | 41 34 949 C2 | 4/1993 |
| DE | 101 54 261 A1 | 6/2002 |
| DE | 102 94 706 A1 | 8/2003 |
| DE | 103 00 671 A1 | 8/2003 |
| EP | 1 205 228 A | 5/2002 |
| EP | 1 411 106 A | 4/2004 |
| WO | 03/100227 | 12/2003 |

OTHER PUBLICATIONS

Patent Abstracts of Japan Appl. No. 2002/123864 (Apr. 25, 2002).

* cited by examiner

*Primary Examiner* — Binh Q Tran
(74) *Attorney, Agent, or Firm* — Klaus J. Bach

(57) ABSTRACT

In a method of operating a particle filter in an exhaust system of a motor vehicle internal combustion engine, wherein the particle filter is reconditioned, in intervals, by a soot-burn-off procedure, the amount of noncombustible ashes also collected in the particle filter is reduced by heating the particle filter and supplying to the particle filter, together with the exhaust gas of the internal combustion engine, a reducing agent which reacts with the ash deposits so as to chemically convert the ash deposits such that at least non-metallic ash components are decomposed and carried out of the particle filter by the exhaust gas.

8 Claims, 1 Drawing Sheet

METHOD OF OPERATING A PARTICLE FILTER IN THE EXHAUST SYSTEM OF A MOTOR VEHICLE'S INTERNAL COMBUSTION ENGINE

This is a Continuation-In-Part Application of international application PCT/EP2004/013265 filed Nov. 23, 2004 and claiming the priority of German application 103 59 395.0 filed Dec. 18, 2003.

BACKGROUND OF THE INVENTION

The invention resides in a method operating a particle filter in an exhaust system of a motor vehicle's internal combustion engine which particle filter is subjected to repeated soot burn-off procedures.

DE 101 54 261 A1 discloses a method for determining the charge of a particle filter. In that method, particle filters as they are used in the exhaust systems particularly of motor vehicle Diesel engines for filtering soot particles out of the exhaust gas, are considered. On or in the particle filters, the retained soot particles slowly accumulate which results in an increasing charge of the filter and a slow increase of the flow resistance of the particle filter. As a result, the exhaust gas backpressure of the filter is increased by the collected particles, which detrimentally affects engine operation. By burning off the collected soot particles, the soot charge of the particle filter can be reduced and a low flow resistance of the filter can be re-established.

The particle filter charge however also includes a collection of ash which cannot be removed by the soot burn-off procedure since the ash consists of non-burnable inorganic substances. The method described in DE 101 54 261 A1 makes it possible, to distinguish between the charge of ashes collected in the particle filter and the charge of soot particles collected in the filter by a determination of the pressure loss across the particle filter. The method makes it therefore possible to determine the success of a soot burn-off procedure. A slow increase of the flow resistance because of an increasing ash charge however cannot be prevented by that procedure, and, finally will lead to uselessness of the particle filter.

Since generally, it is assumed that the ash charge of the particle filter cannot be reduced during operation of the vehicle and particularly not by the common soot burn-off procedure, DE 41 34 949 D1 proposes that the ashes collected in the particle filter are blown out of the filter in a direction opposite to the normal exhaust gas flow direction when the vehicle is present in a service facility. In this way, an inadmissibly high flow resistance of the particle filter can be reversed and the particle filter is then available for further use. However, this method is relatively complex and requires an interruption of the operation of the vehicle.

It is therefore the object of the present invention to provide a method for the operation of a particle filter of a motor vehicle engine whereby the ash charge of the particle filter can be reduced during operation of the motor vehicle.

SUMMARY OF THE INVENTION

In a method of operating a particle filter in an exhaust system of a motor vehicle internal combustion engine, wherein the particle filter is reconditioned, in intervals, by a soot-burn-off procedure, the amount of non-combustible ashes also collected in the particle filter is reduced by heating the particle filter and supplying to the particle filter, together with the exhaust gas of the internal combustion engine, a reducing agent which reacts with the ash deposits so as to chemically convert the ash deposits whereby at least non-metallic ash components are decomposed and carried out of the particle filter by the exhaust gas.

Ash residues consist mainly of chemical compounds in which an anion formed by non-metallic material is bound to a metal cation. Since the ash residues are generally formed in a Diesel engine during engine operation with excess air, the elements contained in the ash residues generally are highly oxidized that is they are generally oxidized to the highest possible degree. Since a reducing compound is supplied to the ash residues, a reaction partner is provided whereby at least parts of the non-metals contained in the anions can be reduced and converted into volatile compounds which are then discharged together with the exhaust gas. With the removal of the non-metallic parts, the amount of ash residues is reduced so that the ash charge of the particle filter is reduced and, together therewith, the backpressure of the exhaust gas which was caused by the ash residues. Consequently, the possible operating period over which the particle filter is usable, is increased.

As reducing agent in this connection, in principle, any substance may be used which can cause the desired chemical conversion. Mainly gaseous reducing compounds such as hydrogen, carbon monoxide or hydrocarbons may be used for admission to the particle filter together with the exhaust gas of the internal combustion engine. Preferably, the particle filter is heated to a temperature of over 500° C. during the ash reducing procedure in order to speed up the disintegration process. During the ash reducing process generally reducing conditions are established in the exhaust gas supplied to the particle filter, that is, an excess of reduction agents is provided. This can be achieved, for example, by supplying to the exhaust gas a sufficiently large amount of the reducing agents.

In a particular embodiment of the invention as reducing agent, a particular fuel is used for operating the engine or the reducing agent is generated from the fuel on board of the vehicle. Since the fuel used for the combustion acts itself as a reducing agent, it can be supplied as reducing agent directly with the exhaust gas to the particle filter for the conversion of the ash residues. A mineral oil-based fuel however may first have to be processed. Preferably, this processing involves a cracking-, reforming- or gasification process. A partial combustion with lack of air is also possible. During such processing reactive compounds, preferably gaseous reducing compounds, are formed which are suitable for the decomposition of ash residues in the particle filter by a reduction process.

In another embodiment of the invention, the reducing agent is added to the exhaust gas upstream of the particle filter from without the exhaust gas duct. In this way, the reducing agent can be added essentially independently of the operation of the internal combustion engine.

In a further embodiment of the invention, the reducing agent is added to the exhaust gas by a secondary fuel injection upstream of the particle filter. In this case, it is advantageous to provide a fuel supply device by way of which the fuel is admitted to the exhaust gas in a finely distributed manner. Preferably, the fuel is at least partially vaporized while, or before, it is admitted to the exhaust duct in order to obtain a highly homogeneous mixture.

In still a further embodiment of the invention, the reducing agent is added to the exhaust gas in the form of fully burned fuel by an under-stoichiometric operation of the internal combustion engine, that is, by operation of the engine with an insufficient amount of air, the fuel supplied to the engine is not completely burned and unburned fuel components remain in the exhaust gas which can decompose the ash residues in the particle filter. Preferably, the under-stoichiometric operation is realized by a follow-up fuel injection subsequent to a torque-effective main fuel injection so that, altogether, an excess amount of fuel is provided. Depending on the execution of the follow-up injection, species can be provided in the exhaust gas, which have different reducing effects. A further processing of these species can be provided for by an oxidation catalytic converter arranged ahead of the particle filter.

In a particular embodiment of the invention, the flow resistance of the particle filter is monitored and the ash decomposition procedure is initiated when the flow resistance exceeds a predetermined value after the completion of a soot burn-out procedure. After completion of a soot-burnout procedure, it can be assumed that any flow resistance-increasing soot charge has been removed from the particle filter so that the flow resistance is caused essentially by ash deposits. If, in this case, it is determined for example by a differential pressure measurement across the particle filter or by measuring the exhaust gas back-pressure ahead of the particle filter that the flow resistance is unacceptably high the ash deposit reducing procedure is performed as soon as possible.

Preferably, the ash-reducing procedure is performed in connection with a soot burn-off procedure. Since, during the soot burn-off procedure, the temperature of the particle filter must be increased anyway, the ash reducing procedure can be performed by an addition of reducing agents immediately before or after the soot burn-off procedure. In this way, a separate, additional heating of the particle filter specifically for the ash reducing procedure is not necessary.

However, the ash reducing procedure may also be performed in connection with each $n^{th}$ soot burn-off procedure wherein n is a certain positive whole number greater than 1. Since the deposition of collecting ashes occurs at a rate which is 5 to 10 times slower than the deposition of soot, it is advantageous to perform the ash reducing procedure only in connection with every fifth to tenth soot burn-off procedure. Since the relation between soot deposition and ash deposition is at least approximately known, the controlling number n is preferably firmly predetermined.

Below, the invention will be described in greater detail on the basis of a number of examples with reference to the accompanying drawings.

DESCRIPTION OF PARTICULAR EMBODIMENTS OF THE INVENTION

Figure 1:
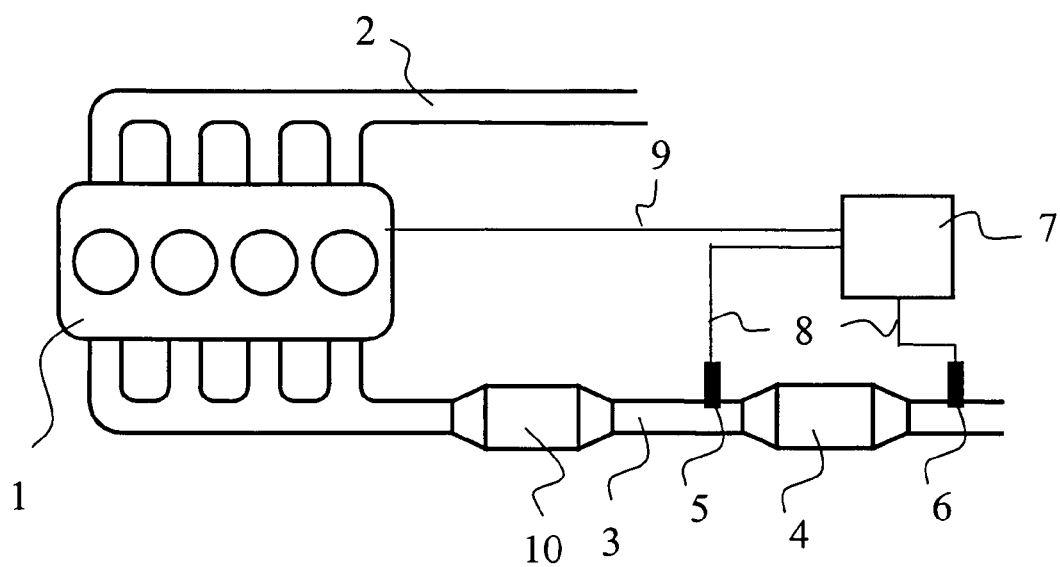
FIG. 1 shows schematically an internal combustion engine with a particle filter.

FIG. 1 shows an internal combustion engine 1 with an intake duct 2 and an exhaust duct 3. The internal combustion engine is preferably a Diesel engine with direct fuel injection.

The exhaust duct 3 includes an oxidation catalytic converter 10 arranged upstream of a particle filter 4. Pressure sensors 5, 6 are disposed in the exhaust duct 3 at the inlet and the outlet of the particle filter 4 so that the pressure loss in the particle filter 4 can be determined. The sensors 5, 6 are connected via signal lines 8 to an electronic control apparatus 7, which is connected by control lines 9 to the internal combustion engine 1 for the control of the operation of the internal combustion engine 1. The control apparatus 7 is furthermore in communication with additional sensors and actuators which are not shown in the figure but which permit the monitoring and control of the operation of the internal combustion engine and the operating state of the motor vehicle.

The control apparatus 7 can specifically interfere with the operation of the internal combustion engine in a manner by which the exhaust gas composition and the heating of the exhaust gas is affected. This concerns mainly changes in the injection parameters such as the number of fuel injection procedures per operating cycle and changes of the ignition point in time and duration thereof. By changing the fuel injection amount furthermore the air ratio of the air/fuel mixture processed in the internal combustion engine 1 can be adjusted for which control members are provided which are not described herein in detail. In any case, the control apparatus 7 is in a position to determine and adjust all the operating parameters of the internal combustion engine 1 and the exhaust system relevant to the operation thereof. Of course, the internal combustion engine 1 includes further components which are not described herein such as an exhaust gas turbocharger, exhaust gas recirculation, temperature sensors for determining the temperatures of the exhaust gas or the temperature in the particle filter 4 or, respectively, in the oxidation catalytic converter 10 etc. . . . . .

The soot particles emitted by the internal combustion engine 1 are filtered by the particle filter 4 out of the exhaust gas during the normal vehicle operation and are collected in the particle filter 4. The soot particles collected in the particle filter 4 cause an increase of the flow resistance of the particle filter which detrimentally affects the operation of the internal combustion engine. This is why soot burn-off procedures have to be performed from time to time.

The need for a soot burn-off procedure is preferably derived from a value of the flow resistance or the charge of the particle filter 4 determined by the sensors 5, 6 measuring the pressure loss across the particle filter 4. However, soot burn off procedures may also be scheduled at predetermined operating time intervals.

A soot burn-off procedure comprises the heating of the exhaust gas and the particle filter 4 to such a degree that a combustion temperature of the soot deposited in the particle filter 4 of 550° C. is reached or exceeded.

For heating the exhaust gas and the particle filter 4, a multitude of measures are available, particularly changes in the operating procedures of the internal combustion engine. Preferably, the parameters for the fuel injection are changed. For example, by an early follow-up injection of fuel into the combustion chamber toward the end of the combustion process, the temperature of the exhaust gas discharged from the engine is increased. By a late follow-up injection of fuel into the combustion chamber unburned fuel components are contained in the exhaust gas, which are then combusted in the oxidation catalytic converter 10 while generating reaction heat. Furthermore, by further concurrent measures such as an adjustment of the exhaust gas recirculation or by throttling the power supplied by the engine can be increased which also increases the exhaust gas temperature. It is necessary in this case, to maintain an oxidizing exhaust gas composition which however occurs anyhow during normal operation of a Diesel engine. The temperature increase obtained is maintained by this measure preferably as long as it is necessary for burning off the soot deposits in the particle filter 4. As a result, the soot charge of the particle filter 4 is decreased and the flow resistance of, or respectively, the pressure loss in, the particle filter 4 is reduced so that proper operation of the internal combustion engine is re-established.

During normal operation of the internal combustion engine however, in addition to soot particles, other particles are collected in the particle filter which cannot be removed by the soot burn-off procedure. These non-combustible particles form a residue which is generally designated as ashes and which also causes a slow increase in the flow resistance of the filter that is superimposed on the resistance caused by the soot charge of the filter.

The actual sources of the ash residues are mainly inorganic components of oil additives or of fuel additives, but also small parts of metallic character generated by engine wear. These substances contain metals and non-metals in bonded form. By an elementary analysis of ash residues, it can be determined that the elements calcium (Ca), magnesium (Mg), iron (Fe) and zinc (Zn) generally are the main components of the metallic ash. The non-metallic elements comprise mainly oxygen (O), sulfur (5), and phosphorus (P). The ash residues deposited in the particle filter therefore mainly comprise sulfates such as calcium sulfate ($CaSO_4$) and phosphates such as mixed magnesium-zinc phosphates. Pure oxides such as iron oxide are also part of the ash residues.

Figure 2:
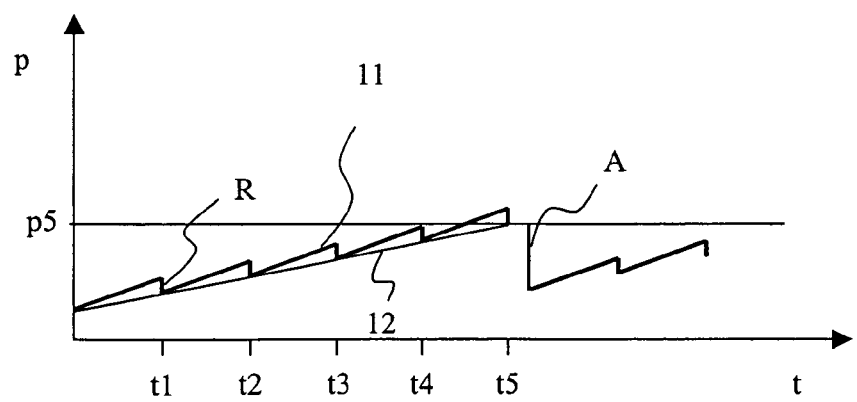
FIG. 2 shows a diagram representing schematically a curve showing the exhaust gas back pressure of a particle filter over time.

The conditions schematically represented in the diagram of FIG. 2 show the charging process of the particle filter 4 with soot and ash particles. In this diagram, the time-dependent value curve for the pressure loss p in the particle filter 4 is shown in a simplified manner. The curve 11 is generally saw-tooth-like. As a result of soot particle burn-off procedures R at the points in time $t_1$, $t_2$ etc., the increase of the pressure loss p caused by the soot deposits is partially reversed. However, overall there is still a slow increase of the pressure loss p as indicated by the connecting line 12 of the local minima of the pressure loss curve 11. This slow increase of the pressure loss p is the result of the increasing volume of ash deposits in the particle filter 4.

In this way, the pressure loss p in the filter 4 slowly approaches a set limit value p5 where the pressure loss has reached a value that is no longer acceptable. Even with a soot-burn off at the time $t_5$ is no longer possible to reduce the resistance to a value well below the limit pressure p5. At this point, without further measures the end of the life of the particle filter 4 has been reached and the particle filter 4 is exchanged or a special cleaning procedure such as blowing out or flushing out of the collected ash deposits is necessary, which procedure must be performed by a special servicing process or with the particle filter 4 removed from the vehicle.

However, the life of the particle filter can also be extended during normal operation of the vehicle if, for example, at the point in time t5 an ash deposit reducing procedure A according to the present invention is performed. Such an ash reducing procedure A resides essentially in the admission to the particle filter 4, during operation of the internal combustion engine, together with the exhaust gas of a suitable reducing agent which reacts at least with parts of the ash residues in such a way that at least some of the non-metallic components of the ash are converted to volatile compounds which are discharged together with the exhaust gas. Particularly, at least parts of the phosphates and/or sulfates are decomposed and converted into the respective carbonates or oxides.

As a result of the ash reducing procedure A, the mass of the ash remaining in the particle filter 4 is reduced so that the pressure loss p drops again substantially below the limit value p5. As a result, the particle filter 4 is again operational and does not need to be replaced. With the conditions as shown in FIG. 2, the ash reducing procedure A was performed in short time intervals after a soot burn-off procedure R performed at a point in time t5 which results in the steep drop of the pressure loss p shown in the figure.

Before discussing advantageous possibilities of performing an ash reducing procedure A the achievable mass reduction of the ash residues collected in the particle filter 4 is estimated by the following simple considerations.

As an example, it is assumed that by magnesium phosphate $Mg_3(PO_4)_2$ is decomposed the reducing agent so as to form magnesium oxide MgO and phosphorus is discharged together with the exhaust gas and removed from the particle filter. In accordance with the mole mass ratios a mass reduction of 54% is obtained thereby. Correspondingly, based on zinc phosphate $Zn_3(PO_4)_2$ the decomposition of zinc oxide ZnO results in a mass reduction by 37%. In the decomposition of calcium sulfate $CaSO_4$ with the formation of calcium carbonate $CaCO_3$ a mass reduction of 27% is achieved and the sulfur which is bound to the calcium is discharged together with the exhaust gas.

With the reduction of the mass of the ash residues deposited in the particle filter 4, a correspondingly larger reduction of the pressure loss p in the particle filter 4 is achieved. The reduction of the pressure loss may even be greater than proportional since, as a result of the reactions occurring in the ash residues, their consistency or respectively, morphology is changed so that they have a greater gas permeability.

Below, advantageous possibilities for performing an ash reduction procedure are discussed with reference to FIG. 1.

For performing the ash reduction procedure, the particle filter is heated to the minimum temperature designated below as ash decomposition temperature, provided the particle filter is not already at the ash decomposition temperature. To achieve this, commonly known measure can be employed, for example as described already earlier. They are therefore not again discussed in detail. The ash decomposition depends on the reducing medium utilized for the ash decomposition and is typically performed at above 400° C. preferably about 600° C. to 700° C.

After reaching the ash decomposition temperature, a reducing agent is added to the exhaust gas upstream of the particle filter 4, which is capable of decomposing, by chemical reaction, at least non-oxide ash components in such a way that, as a result, non-metallic elements present in the ash components are converted, preferably reduced, into volatile compounds and are discharged together with the exhaust gas. The ash components which can be decomposed comprise typically phosphates and sulfates. By reaction with the added reduction agent, the oxidation stage of the phosphorus or, respectively, the sulfur is reduced whereby these elements are converted to a volatile state. To this end, an overall reducing atmosphere is provided, that is, an air deficiency is established in the particle filter 4.

As reducing agent mainly a gaseous reduction medium such as hydrogen, carbon monoxide, ammonia or hydrocarbons or, respectively, mixtures thereof are usable. Such reducing agents may be provided from without the exhaust duct for example where they may be stored in a storage container. It is however particularly advantageous to generate the reduction agents on board from the fuel carried along in the vehicle. Below, it is assumed that the fuel is a hydrocarbon-containing mineral oil fuel. For the extraction of gaseous reduction media of the type mentioned above from the fuel a reactor may be provided in which the fuel is processed accordingly. The reactor is preferably so designed that a reforming, cracking or splitting process occurs, by which at least parts of the reduction agents mentioned above are formed from the fuel. These reduction agents are then supplied to the exhaust duct for the reductive decomposition of the ashes. To this end, it is expedient to provide a suitable supply apparatus which is not shown in FIG. 1 but which is arranged at the inlet of the oxidation catalytic converter 10 and/or the particle filter.

It is also possible to add the fuel directly to the exhaust gas at the adding locations referred to earlier, particularly in a finely divided manner by a secondary injection. It is particularly advantageous to at least partially vaporize the fuel before, or when, it is added to the exhaust gas, whereby a homogeneous distribution in the exhaust gas is obtained.

It is furthermore advantageous, if the fuel is processed in the internal combustion engine such that the exhaust gas contains reactive species which cause a reductive decomposition of the phosphate-, and or sulfate-containing ash components. To this end, it is advantageous to establish in the internal combustion engine 1 an overall reducing combustion. Particularly, it is advantageous in this connection if an early or late additional injection of fuel into the combustion chamber of the internal combustion engine occurs subsequent to the main fuel injection by which the engine torque is generated. With this type of fuel processing fuel cracking or incomplete combustion occurs in the engine whereby corresponding reactive species or agents are formed and supplied to the exhaust gas. In this process, mainly low molecular reduction agents such as hydrogen, carbon monoxide and short-chain, possibly unsaturated hydrocarbons are generated with an early additional fuel injection. With a late additional fuel injection, in contrast, higher molecular reduction agents such as long-chain hydrocarbons are formed which can also be very effective in a reductive ash decomposition.

In connection with a late additional injection of fuel into the combustion chamber of the internal combustion engine 1, but also with a secondary fuel injection upstream of the oxidation catalytic converter 10, further reformation processes or a water gas shift reaction may occur which, particularly with an overall reducing rich exhaust gas, results in an enrichment of hydrogen in the exhaust gas. The additionally produced hydrogen generated thereby is a strong reduction agent which is capable of very effectively decomposing the non-metallic ash components in the particle filter 4.

It is advantageous to perform the ash reducing procedure in connection with a soot burn-off procedure because the high exhaust gas temperature needed for the ash decomposition must also be provided for the soot burn-off. However, in contrast to the oxidizing condition under which the soot burn-off occurs, preferably a reducing atmosphere is provided in the particle filter 4 for the ash reducing procedure. The reducing conditions of the ash reducing procedure can be provided shortly before the soot burn-off or following the soot burn-off.

Since the ash deposits are accumulated substantially slower than the soot particles, it is advantageous to initiate the ash reducing procedure only when required in connection with a soot burn-off procedure. The frequency of the ash reducing procedures may therefore be pre-determined depending on the frequency of the soot burn-off procedures. For example, an ash reducing procedure may be scheduled in connection with every $5^{th}$ or every tenth, generally every $n^{th}$ soot burn-off procedure. It is possible to distinguish during the determination of the pressure loss p in the particle filter 4 between the pressure loss part caused by the soot charge and that caused by the ash charge. The execution of an ash reducing procedure can then be made dependent on the part of the pressure loss p which is caused by the ash charge of the particle filter 4.

What is claimed is:

1. A method of operating a particle filter (4) in an exhaust system of a motor vehicle internal combustion engine (1), wherein the particle filter (4), which collects soot particles and ashes, is re-conditioned, in intervals, by a soot-burn off procedure, but wherein, in addition to soot, also non-combustible ashes are deposited during operation of the internal combustion engine, said method comprising the steps of: reducing, in an ash reducing procedure (A), the mass of the ash deposits in the particle filter by heating the particle filter and supplying to the particle filter, together with the exhaust gas of the internal combustion engine (1), a reducing agent which reacts with the ash deposits so as to chemically convert the ash deposits such that at least non-metallic constituent parts of the ash deposits are carried out of the particle filter (4) by the exhaust gas.

2. A method according to claim 1, wherein as reducing agent a fuel used for operating the engine (1) is employed or the reducing agent is produced from the fuel on board of the motor vehicle.

3. A method according to claim 1, wherein the reducing agent is added to the exhaust gas upstream of the particle filter (4).

4. A method according to claim 3, wherein the reducing agent is added to the exhaust gas by a secondary fuel injection.

5. A method according to claim 1, wherein the reducing agent is provided in the form of incompletely burned fuel generated by under-stoichiometric operation of the internal combustion engine (1).

6. A method according to claim 1, wherein the exhaust gas flow resistance in the particle filter (4) is monitored and the ash reducing procedure (A) is initiated when, after a soot burn-off procedure (R), the exhaust gas flow resistance in the particle filter exceeds a predetermined value.

7. A method according to claim 1, wherein an ash reducing procedure (A) is performed in connection with a soot-burn-off procedure (R).

8. A method according to claim 7, wherein an ash reducing procedure (A) is performed in connection with each $n^{th}$ soot burn-off procedure (R) wherein n is a predetermined number greater than 1.

* * * * *